(12) United States Patent
Vrhovec (10) Patent No.: US 12,473,935 B2
(45) Date of Patent: Nov. 18, 2025

(54) SELF-LOCKING FLUIDIC CLAMPING DEVICE

(71) Applicant: Miha Vrhovec, Horjul (SI)

(72) Inventor: Miha Vrhovec, Horjul (SI)

( * ) Notice: Subject to any disclaimer, the term of this patent is extended or adjusted under 35 U.S.C. 154(b) by 300 days.

(21) Appl. No.: 18/096,081

(22) Filed: Jan. 12, 2023

(65) Prior Publication Data

US 2023/0220856 A1    Jul. 13, 2023

(30) Foreign Application Priority Data

Jan. 13, 2022    (DE) ............ 10 2022 100 748.0

(51) Int. Cl.
*F15B 15/26*   (2006.01)
*B25B 5/06*    (2006.01)

(52) U.S. Cl.
CPC ............ *F15B 15/262* (2013.01); *B25B 5/065* (2013.01)

(58) Field of Classification Search
CPC ............................. F16B 15/262; B25B 5/065
See application file for complete search history.

(56) References Cited

U.S. PATENT DOCUMENTS

| | | | | |
|---|---|---|---|---|
| 3,834,257 | A * | 9/1974 | Ganser ................. | B29C 53/78 242/571.1 |
| 6,629,584 | B1 * | 10/2003 | Muller .................. | B25B 5/065 403/31 |
| 2006/0042892 | A1 | 3/2006 | Hofmann | |

FOREIGN PATENT DOCUMENTS

DE    10 2022 100 748.0    1/2022

* cited by examiner

*Primary Examiner* — Seahee Hong
(74) *Attorney, Agent, or Firm* — Sand, Sebolt & Wernow Co., LPA (57) ABSTRACT

The present invention provides a fluidic clamping device (100) comprising a sleeve (110) for clamping and holding a movable part (200). The sleeve (110) comprises a central element (111) having a cross-section in a longitudinal direction of the central element (111), comprising a cavity configured to receive the movable part (200). The fluidic clamping device (100) is characterized in that the sleeve (110) further comprises at least one chamber (112) disposed on an outer periphery of the central element (111) and extending along a longitudinal direction of the central element (111), the at least one chamber (112) configured to containing a fluid, wherein the fluidic clamping device (100) is configured to pressurize an interior of the at least one chamber (112) with a first predetermined fluidic pressure or a second predetermined fluidic pressure, wherein the first predetermined fluidic pressure is lower than the second predetermined fluidic pressure, and wherein the central element (111) is configured to be in frictional contact with the movable part (200) at at least a portion of an inner periphery of the central element (111) and to clamp and hold the movable part (200) in a first state in which the interior of the at least one chamber (112) is pressurized with the first fluidic pressure, and wherein the central element (111) is configured not to be in frictional contact with the movable part (200) at any portion of the inner periphery of the central element (111) in a second state in which the interior of the at least one chamber (112) is pressurized with the second fluidic pressure.

16 Claims, 5 Drawing Sheets

SELF-LOCKING FLUIDIC CLAMPING DEVICE

PRIORITY INFORMATION

The present application claims priority from German Patent Application No: 10 2022 100 748.0, filed on Jan. 13, 2022.

FIELD OF THE INVENTION

The present invention relates to a device for statically clamping and holding cylindrical, prismatic or cuboid parts of, for example, rotary or linear axes in automation equipment, machine tools, robotics and other applications, in precision hydraulics or precision pneumatics.

STATE OF THE ART

From the prior art, various clamping and holding devices are known in precision hydraulics, which are used for static securing and clamping of movable parts. For example, there is an approach in safety engineering based on conical or tapered elements. In the event of a failure of a service brake or a drive such as hydraulics in a machine, clamping and holding devices comprising said conical or tapered elements may be used. For example, the conical or tapered elements may prevent a moving heavy load from falling on persons in the event of a failure of a drive. The advantages of the conical or tapered elements are a strong holding force and a self-locking clamping. The disadvantage is that clamping or releasing the clamping by the conical or tapered element displaces the load. This results in low clamping precision. Furthermore, the conical or tapered element cannot be used without other components. The components are movable and therefore subject to friction and wear and require high maintenance. Further disadvantageously, the components comprising the conical or tapered element are of heavy weight and large circumference compared to the diameter of the movable load and are therefore not suitable for space-constrained applications. In another approach, clamping sleeves are used. The holding force of these clamping sleeves is achieved by applying hydraulic pressure to the sleeve shell from the outside. Thus, a high clamping precision can be achieved without the use of additional moving parts. Furthermore, such a clamping sleeve has a compact circumference and a low weight. The disadvantage of such clamping sleeves is that the hydraulic pressure must be maintained during the entire clamping process. When such a clamping sleeve is used in conjunction with heavy loads, an additional safeguard becomes necessary to prevent the heavy load from causing unrestrained damage in the event of hydraulic failure. Therefore, the complexity and price of a hydraulic system applying such clamping sleeves are excessively increased. For static clamping of machine tools such as cutting devices, polygonal shaped holders are used. However, the holders are passive and require a special device to clamp and release a tool.

Thus, it is the object of the present invention to provide a self-locking fluidic clamping device that allows high-precision clamping and has a compact size as well as light weight. In addition, the present invention is directed to providing a self-locking fluidic clamping device which, due to its self-locking property, is capable of securely holding heavy loads without the need to maintain constant fluidic pressure during operation.

DESCRIPTION OF THE INVENTION

The above problem is solved by a fluidic clamping device comprising a sleeve for clamping and holding a movable part, the sleeve comprising: a central element having a cross-section in a longitudinal direction of the central element and comprising a cavity configured to receive the movable part. The fluidic clamping device is characterized in that the sleeve further comprises: at least one chamber disposed on an outer periphery of the central element and extending along the longitudinal direction of the central element, the at least one chamber configured to receive a fluid, wherein the fluidic clamping device is configured to pressurize an interior of the at least one chamber with one of first and second predetermined fluidic pressures, wherein the first predetermined fluidic pressure is lower than the second predetermined fluidic pressure; and wherein the central element is configured, in a first state in which the interior of the at least one chamber is pressurized with the first fluidic pressure, to be in frictional contact with the movable part at at least a portion of an inner periphery of the central element and to clamp and hold the movable part; and wherein the central element is configured, in a second state in which the interior of the at least one chamber is pressurized with the second fluidic pressure, not to be in frictional contact with the movable part at any portion of the inner periphery of the central element.

The fluidic clamping device may be, for example, a hydraulically or pneumatically operated clamping device. According to the invention, the sleeve comprises a central element. The central element may be a tubular body capable of receiving an object. The central element extends longitudinally along a longitudinal axis of the sleeve and radially perpendicular to the longitudinal axis.

According to the invention, the central element of the sleeve has a cross-section in the longitudinal direction. The cross-section may be constant, wherein the term "constant" means that the outline and shape of the cross-section remain constant along the longitudinal direction of the central element. When the cross-section is constant in the longitudinal direction, the outer and inner circumferences of the central element do not change along the longitudinal direction. Further, the dimensions of the central element may remain the same in cross-section along the longitudinal direction. The sleeve including the at least one chamber may also have a constant cross-section along the longitudinal direction. The cross-section may be variable in the longitudinal direction such that the inner circumference of the central element can be constant while the outer circumference of the central element may be slightly variable. The sleeve including the at least one chamber may also have a variable cross-section along the longitudinal direction.

According to the invention, the at least one chamber is arranged at the outer periphery of the central element of the sleeve and extends along the longitudinal direction of the central element. The central element may be surrounded by a plurality of chambers. The at least one chamber may comprise a wall. The wall of the at least one chamber may have a portion located toward the outer periphery of the central element and a portion positioned away from the outer periphery of the central element. The at least one chamber may be shaped in cross-section such that a length of the portion of the wall of the at least one chamber located toward the outer periphery of the central element is shorter than a length of the portion positioned away from the outer periphery of the central element. The at least one chamber may be disposed on the outer periphery of the central element such that a portion of the outer periphery of the central element forms the portion of the wall of the at least one chamber that is located toward the outer periphery of the central element. Alternatively, the portion of the outer periphery of the central element may be permanently bonded to the portion of the wall of the at least one chamber located toward the outer periphery of the central element. The at least one chamber may be formed such that a thickness of the portion of the wall being positioned away from the outer periphery of the central element is smaller than a thickness of the remaining wall. The at least one chamber may be formed such that a thickness of the portion of the wall located toward the outer periphery of the central element is formed to be greater than a thickness of the remaining wall.

According to the invention, the first predetermined fluidic pressure is lower than the second predetermined fluidic pressure. The first predetermined fluidic pressure may be zero or may correspond to an ambient pressure, such as an ambient air pressure. The fluidic pressure may comprise hydraulic pressure or pneumatic pressure. The application of the fluidic clamping device is not limited to any particular fluid. Any fluid may be used to exert the fluidic pressure. For example, the fluid may comprise hydraulic oil, water or air.

According to the invention, in a first state in which the interior of the at least one chamber is subjected to the first fluidic pressure, the central element has at least one region on an inner periphery of the central element that is in frictional contact with the movable part when the movable part is inserted into the sleeve. In the first state, the at least one chamber and the central element of the sleeve may have an initial shape. When the movable part is not inserted into the sleeve, the at least one portion at the inner periphery of the central element may protrude into the cavity in cross-section in the first state.

The movable part may be, for example, a cylindrically shaped part that is rotated or translationally moved. The movable part may be, for example, a polygonally shaped part that is moved translationally.

The fluidic clamping device according to the invention can be operated in a clamping and holding state without supplying energy in the form of fluidic pressure. The supply of energy in the form of fluidic pressure is only necessary when the clamping and holding state is terminated. During the initiation of the clamping and holding state and during the termination of the clamping and holding state, no movement or displacement is exerted on the movable part by the fluidic clamping device according to the invention. Furthermore, the fluidic clamping device according to the invention grants increased safety, since the clamping and holding state can take place without energy in the form of fluidic pressure and this state is maintained even in the event of a possible operational failure of the energy supply. Thus, the invention provides a self-locking fluidic clamping device with the advantages described above.

According to a further embodiment, the at least one chamber is configured to elastically deform from an initial shape when the second fluidic pressure is applied to the interior of the at least one chamber and to return to its initial shape when the first fluidic pressure is applied to the interior of the at least one chamber. A precise outline of the at least one chamber may be adapted in cross-section to achieve a shape in which the deformation obtained is maximized in the region of the inner periphery of the central element, where the central element and the movable part are in frictional contact, for a given fluidic pressure. As a result, a clearance or running fit between the inner periphery of the central element and the movable part can be achieved. The size, wall thickness, angle at which the at least one chamber is attached to the central element, transition radii, and other geometric characteristics of the outline of the at least one chamber can be adjusted accordingly. At the same time, the central element may be adjusted in cross-section to reduce local material stresses in the sleeve when the at least one chamber is pressurized to ensure operation within the elastic region of the stress-deformation curve of the material selected for the sleeve. This can reduce material fatigue during repeated operation and increase the life of the sleeve.

According to a further embodiment, the cross-section of the central element in a second state in which the at least one chamber is subjected to the second fluidic pressure is circular or has a polygonal shape. For example, in the case of a rotating cylindrical movable part, the cross-section may be circular. In the case of a translationally movable part, the cross-section may have any polygonal shape corresponding to the shape of the movable part. The cross-section of the central element may be non-circular in a first state in which the at least one chamber is subjected to the first fluidic pressure.

According to a further embodiment, when the interior of the at least one chamber is subjected to the second fluidic pressure, the cross-section of the central element is elastically deformable radially from a longitudinal axis and/or the at least one chamber is further configured to elastically deform away from the central element in a transverse direction that is perpendicular to the longitudinal direction when the interior of the at least one chamber is subjected to the second fluidic pressure. When the second fluidic pressure is applied to the interior of the at least one chamber, forces may be generated in the interior of the at least one chamber that push outwardly from the interior of the at least one chamber. The portion of the wall of the at least one chamber remote from the central element may be shaped in cross-section to curve arcuately outwardly (concavely) from the interior of the at least one chamber. Alternatively, the portion of the wall of the at least one chamber remote from the central element may be shaped in cross-section to be straight. The portion of the wall of the at least one chamber being positioned away from the central element may present less resistance to the forces generated inside the at least one chamber than the portion of the wall opposite thereto, which is located towards the outer circumference of the central element. As a result, the portion of the wall being positioned away from the outer circumference of the central element may be elastically deformed by the forces generated and the at least one chamber may be forced from its initial shape into a shape stretched away from the cavity.

The at least one chamber and the central element of the sleeve may be formed in a cross-section to be relatively inflexible and rigid along the longitudinal direction of the sleeve. The at least one chamber and the central element of the sleeve may be formed in the cross-section to be torsionally rigid about the axis of the longitudinal direction. In contrast, the at least one chamber and the central element of the sleeve may be relatively flexible with respect to radial forces in the plane of the same cross-section.

The at least one chamber may be filled with a fluid, for example a hydraulic fluid, air or a gas. The fluidic clamping device may be actuated by applying or releasing hydraulic or pneumatic pressure to the at least one chamber, whereby the cross-section of the sleeve may be elastically deformed.

According to a further embodiment, the deformation of the central element can be effected by deforming the at least one chamber. By connecting the at least one chamber to the central element, when the second fluidic pressure is applied to the interior of the at least one chamber, tensile forces are generated which act on the central element. As a result, the at least one portion of the inner periphery of the central element that protrudes into the cavity is pulled out of the cavity, such that no portion of the inner periphery of the central element is in frictional contact with the movable part in the presence of the movable part. In cross-section, the central element may have a clearance or running fit between the inner periphery of the central element and the movable part. The clearance or running fit allows the central element and the movable part to be displaced relative to each other.

The contours of the central element can be formed in such a way that a desired running fit and sliding fit with respect to the movable part can be obtained exactly at the second, fluidic pressure. For example, a running fit of H7/g6 can be formed according to the DIN standard DIN 7157. Further standards are for example DIN 7154 and DIN 7155. The DIN standard DIN 7157 defines fit selections in the fit systems "unit bore" and "unit shaft". For the combination in the system "unit bore with clearance" (running fits), the letter "H" designates the design for the bore and the letter "g" the design for the shaft. The movable part can be accurately guided by the sleeve due to a defined clearance when the sleeve is in the second state in which the interior of the at least one chamber is subjected to the second fluidic pressure.

According to yet another further embodiment, the fluidic clamping device further comprises: an upper cap disposed at an upper end of the at least one chamber; a lower cap having at least one opening, the lower cap disposed at a lower end of the at least one chamber; and a connecting flange having a channel and at least one channel entry opening, the channel in fluid communication with the at least one opening of the lower cap. The upper cap may be annular or polygonal in shape corresponding to the central element. An inner periphery of the upper cap may have a different cross-sectional shape than an outer periphery of the upper cap. The upper cap may form an upper closure of the fluidic clamping device according to the invention. The upper cap may be shaped to allow the movable part to pass through the upper cap. The upper cap may close the at least one chamber. The lower cap may be annular in shape or polygonal in shape corresponding to the central element. An inner periphery of the lower cap may have a different cross-sectional shape than an outer periphery of the lower cap. The lower cap may form a lower closure of the fluidic clamping device according to the invention. The lower cap may be shaped to allow the movable part to pass through the lower cap. In a manufacturing process of the fluidic clamping device, the upper cap, the sleeve, the lower cap and the connecting flange may be joined together to form a single, monolithic element. This has the advantage that there are no moving parts due to the resulting, monolithic structure. Thus, there is no need for maintenance of moving parts that would be subject to wear and friction.

According to a further embodiment, a number of the at least one opening of the lower cap corresponds to a number of the at least one chamber. Each of the at least one opening of the lower cap may be in fluid communication with each of the at least one chamber.

According to another further embodiment, the connection flange is further configured to distribute the fluid from the at least one channel inlet opening through the channel and the at least one opening of the lower cap into the at least one chamber.

According to a further embodiment, the central element and the at least one chamber are formed integrally.

According to a further embodiment, the upper cap, the lower cap and the connecting flange are inelastic and remain rigid in the first state or the second state. The upper cap, the lower cap, and the connecting flange do not deform when the second fluidic pressure is applied to the interior of the at least one chamber. The upper cap, the lower cap and the connecting flange always maintain their original shape during operation and out of operation of the fluidic clamping device, that is, they do not bend or deform.

According to a further embodiment, the sleeve, the upper cap, the lower cap and the connecting flange comprise the same material. The material may have suitable, mechanical properties for the desired application and clamping force. The material may be a suitable composite of metals, polymers and other materials. For an application where a high clamping force is to be achieved, the material may be a high strength steel or spring steel, for example a DIN/EN 51CrV4 steel or similar material. The material may suitably be heat treated, hardened or tempered to obtain the optimum, mechanical properties for a desired operational performance and lifetime. In particular, sufficient deformation resistance and fatigue strength may be achieved for a given fluidic pressure in the sleeve during repeated clamp-release operation. More preferably, the sleeve, the upper cap, the lower cap and the connecting flange are made of the same material and are joined together so that the clamping device forms a single part. When the sleeve, upper cap, lower cap and connecting flange are made of steel or other metallic material, the sleeve, upper cap, lower cap and connecting flange may be joined together by brazing or soldering. This ensures an adequate connection between all parts in terms of mechanical integrity and sealing of the at least one chamber, and achieves a single, monolithic element as a fluidic clamping device. The solder fill material may have suitable, mechanical properties to withstand the structural stress caused by the fluidic pressure. The braze filler material may further have an appropriate melting point compatible with the required heat treatment of the material for the sleeve, top cap, bottom cap, and connecting flange. For example, if the material for the sleeve, top cap, bottom cap, and connecting flange is DIN/EN 51CrV4 steel, the brazing filler material may be a nickel-based alloy, such as Ni 7Cr 4.5Si 3B 3Fe. The joining process may start with a brazing step, for example in a vacuum brazing furnace, to join the separated parts, namely the sleeve, the upper cap, the lower cap and the connecting flange. Subsequently, the above mentioned heat treatment steps may be performed on the obtained monolithic structure, not exceeding the melting temperature of the brazing filler material, in order to obtain required mechanical properties of the fluidic clamping device.

According to a further embodiment, a number of the at least one chamber is two, three or more. The number of the at least one chamber may depend on the size and shape of the movable part. For example, the number of the at least one chamber may be three or four when the central element is circular. Depending on the size and shape of the central element, the number of the at least one chamber may be greater than four. When the central element is polygonal in shape, the number of the at least one chamber may be equal to the number of polygonal sides of the central element. However, the number of the at least one chamber may be any higher or lower number.

A high holding force, clamping speed and/or high transmissible torque with high clamping precision are achieved by the present invention. The fluidic clamping device according to the present invention has compact dimensions and low weight. It ensures ease of installation, with no need to consider how to seal the fluidic clamping device and is functionally complete without additional components. Furthermore, because the amplitude of the chamber deformation is small, the required energy for the transition from the first state into second state (i.e. clamping operation) is low. The transition from the second state into first state (i.e. unclamping operation) is passive, as the fluid is displaced from the chamber(s) as they are returning elastically to the initial shape.

The present invention also provides a system for clamping and holding a movable part, the system comprising a fluidic clamping device as described above and the movable part.

The present invention also provides a method, in particular for fluidically clamping and holding a movable part with a sleeve in a fluidic clamping device. The method comprises the following steps: Pressurizing an interior of at least one chamber of the sleeve with a first or second predetermined fluidic pressure, the first predetermined fluidic pressure being lower than the second predetermined fluidic pressure, receiving the movable part in a cavity of a central element of the sleeve in a second state in which the interior of the at least one chamber is pressurized with the second fluidic pressure, wherein the central element is not in frictional contact with the movable part at any portion of an inner periphery of the central element, clamping and holding the movable part in a first state in which the interior of the at least one chamber is pressurized with the first fluidic pressure, wherein the central element is in frictional contact with the movable part at at least a region of an inner periphery of the central element, wherein the central element has a cross-section that may be constant in a longitudinal direction of the central element, and wherein the at least one chamber is disposed at an outer periphery of the central element and extends along a longitudinal direction of the central element. The method according to the invention can be carried out with the fluidic clamping device according to the invention, which has been described above.

According to a further aspect, the method further comprises the steps of: elastically deforming the at least one chamber from an initial shape upon application of the second fluidic pressure to the interior of the at least one chamber; and returning the at least one chamber to the initial shape upon application of the first fluidic pressure to the interior of the at least one chamber.

Further features and exemplary embodiments, as well as advantages of the present invention, will be described in more detail below with reference to the drawings. It will be understood that the embodiments do not exhaust the scope of the present invention. It will be further understood that some or all of the features described below may also be combined in other ways.

EMBODIMENTS

In the figures described below, identical reference signs denote identical elements. For the sake of clarity, identical elements are described only at their first occurrence. However, it is understood that the variants and embodiments of an element described with reference to one of the figures may also be applied to the corresponding elements in the other figures.

Figure 1:
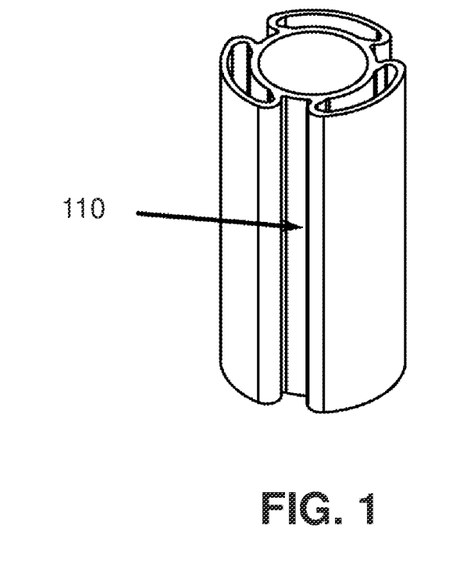
FIG. 1 shows schematically a three-dimensional view of a sleeve according to the present invention.

FIG. 1 schematically illustrates an exemplary sleeve 110 of the fluidic clamping device according to the present invention. Without limiting generality, the cross-section of FIG. 1 shows three chambers surrounding a central element having a cavity. The central form is cylindrical in shape in FIG. 1. The central element may have another shape corresponding to the movable part, such as a polygonal shape. The number of chambers surrounding the central element may be less or more than three. In the case of a polygonal shape, the number of chambers may correspond to a number of polygonal sides. The sleeve 110 shown in FIG. 1 is integrally formed. Alternatively, the sleeve 110 may be formed such that the chambers are permanently fixed to the central element as separate components. The outline of the sleeve may be formed to be inelastic and rigid in the longitudinal direction of the sleeve. The longitudinal direction of the sleeve is orthogonal to the cross-section of the sleeve.

Figure 2:
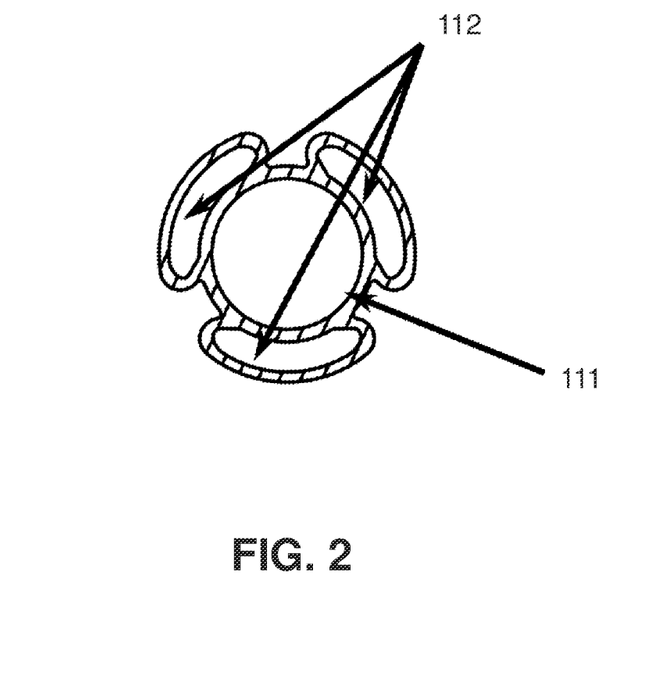
FIG. 2 shows a cross-sectional view of a sleeve having a central element and chambers according to the present invention.

FIG. 2 schematically illustrates a cross-section of the exemplary sleeve 110 of FIG. 1. In FIG. 2, the sleeve 110 has three chambers 112 and a central element 111. As can be seen from FIG. 2, a portion of the outer periphery of the central element 111 forms a portion of the wall of a chamber 112. Alternatively, the portion of the outer periphery of the central element 111 may be permanently fixed to a portion of the wall of a chamber 112. The central element 111 may have any shape corresponding to a movable part received within the cavity of the central element 111. The size and number of chambers 112 will depend on the size and shape of central element 111, such that the size and number of chambers 112 may be different from the chambers 112 shown in FIGS. 1 and 2. The chambers 112 may be filled with fluid. For example, the fluid may be hydraulic oil, water, or air. Further, the chambers 112 may be pressurized or relieved of fluid pressure.

Figure 3:
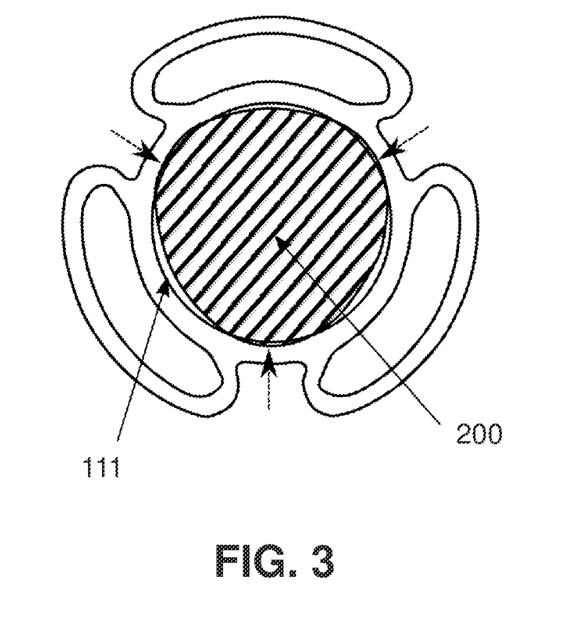
FIG. 3 shows a cross-sectional view of a sleeve without fluid pressure according to the present invention.

FIG. 3 schematically illustrates a cross-sectional view of the exemplary sleeve 110 of FIGS. 1 and 2. In FIG. 3, the sleeve 110 is shown in a first state in which a first fluidic pressure is applied to the interior of the chamber 112. The first fluidic pressure may be zero or may correspond to an ambient pressure, such as an ambient air pressure. FIG. 3 further illustrates the movable part 200 in cross-section. The fluidic clamping device is functional and operable even without the movable part 200. In a default setting, the chambers 112 may be filled with a fluid in a first state in which the sleeve 110 is subjected to the first fluidic pressure. As can be seen from the cross-sectional view of FIG. 3, each of the chambers 112 has an elliptical or oval shape in cross-section that curves around a portion of the outer periphery of the central element 111. FIG. 3 further shows three regions of the inner periphery of the central element 111 that extend into the cavity of the sleeve 110, such that the regions are in frictional contact with the movable part 200. The areas where the central element 111 is in frictional contact with the movable part 200 are illustrated with dashed arrows in FIG. 3. The frictional contact regions precisely fix and clamp the movable part 200 relative to the sleeve 110 in all rotational and translational degrees of freedom.

Figure 4:
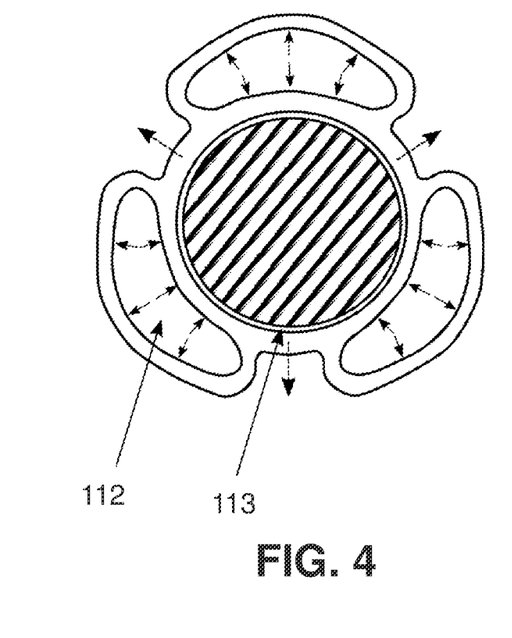
FIG. 4 shows a cross-sectional view of a sleeve subjected to fluid pressure in accordance with the present invention.

FIG. 4 illustrates a cross-sectional view of the sleeve 110 in a second state, in which the interior of the chambers 112 is subjected to a second fluidic pressure. The second fluidic pressure is higher than the first fluidic pressure. The second fluidic pressure may be a hydraulic pressure or a pneumatic pressure. As shown graphically in FIG. 4, the chambers 112 and the central element 111 deform elastically when the chambers 112 are subjected to the second fluidic pressure. From the cross-sectional view of FIG. 4, it can be seen that the deformation of the central element 111 forms a slight predetermined running fit 113 between the inner periphery of the central element 111 of the sleeve 110 and the movable part 200. In this example, the movable part 200 has a circular shape. The central element 111 is deformed into a circular hollow shape in cross-section by the application of the second fluidic pressure. Alternatively, the movable part 200 may have a polygonal shape. If the movable part 200 has a polygonal shape, the central element 111 may have a polygonal shape corresponding to the movable part 200. The forces generated by the application of the second fluidic pressure inside the chambers 112 are shown with arrows in FIG. 4. The direction of elastic deformation of the central element 111 is indicated with dashed arrows in FIG. 4. The running fit 113 obtained by the deformation now allows a translational movement of the movable part 200 relative to the sleeve 110 in the longitudinal direction of the sleeve 110. In the case of the cylindrically shaped movable part 200, a rotational movement about the longitudinal axis is also possible. In the case of a polygonally shaped movable part 200 and a correspondingly polygonally shaped central element 111, the application of the second fluidic pressure to the interior of the chambers 112 can form the running fit 113 between the sleeve 110 and the movable part 200 that allows translational movement of the movable part 200 along the longitudinal axis of the sleeve 110. The contours of the central element 111 may be formed to accurately maintain a desired running fit or sliding fit with respect to the movable part 200 at the predetermined fluidic pressure. For example, a running fit of H7/g6 may be formed in accordance with the DIN standard DIN 7157. In the combination of running fits, the letter "H" may denote the design for the bore and the letter "g" may denote the design for the shaft. The movable part 200 can be accurately guided by the sleeve 110 due to the defined clearance, when the sleeve 110 is in the second state subjected to the second fluidic pressure.

In the second state, when the interior of the chambers 112 is subjected to the second fluidic pressure, forces may be generated in the interior of the chambers 112 to push outwardly from the interior, as shown in FIG. 4 by the arrows. The portion of the wall of the curved elliptical-shaped chambers 112 further away from the central element 111 is curved outwardly (concave). Compared to the portion of the wall adjacent to the central element 111, which is curved in the opposite direction to the applied forces, the portion more distant from the central element 111 exerts less resistance to the applied forces. Therefore, the more distant portion is pushed outwardly by the forces created, that is, in a direction away from the periphery of the central element 111. In other words, due to the forces, the more distant portion of the wall flexes concavely to a greater extent outwardly. The chambers 112 deform elastically. The elastic deformation creates a pull on the two lateral portions of the transformation of the chambers 112. The tensile forces created act in a direction away from the cavity of the central element 111. The outer periphery of the central element 111 is in radial communication with the chambers, and experiences the tensile forces acting on the two lateral portions of the transformation of the chambers 112. An elastic deformation of the outer periphery of the central element 111 results, such that the regions of the central element 111 that are projected into the cavity when the first fluidic pressure is applied are pulled out of the cavity and away from the movable part 200. The running fit 113 is formed. The dashed arrows in FIG. 4 indicate the direction in which the pulling forces are applied.

When the interior of the chambers 112 is relieved of the second fluidic pressure, the chambers 112 and the central element 111 return to their initial shape and the movable part 200 is again fixed and clamped.

Figure 5:
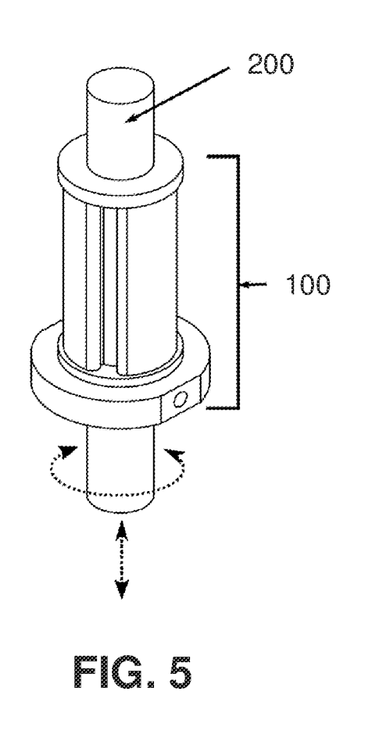
FIG. 5 shows a three-dimensional view of a fluidic clamping device according to the present invention.
Figure 6:
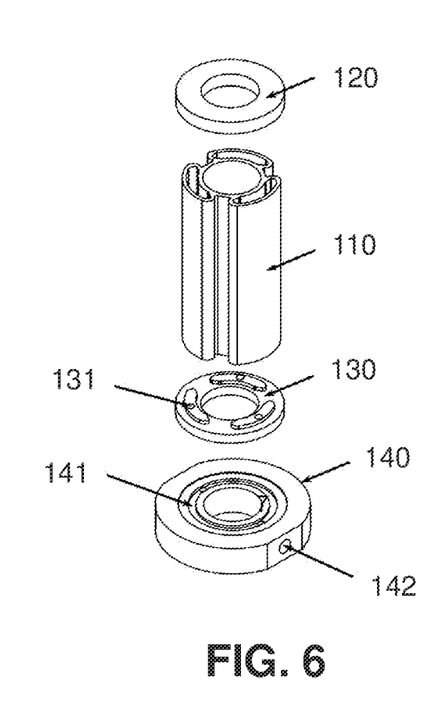
FIG. 6 shows an exploded view of a fluidic clamping device according to the present invention.

FIG. 5 schematically illustrates an example of a fluidic clamping device 100 according to the present invention, comprising the sleeve 110 described above and other components which can be seen in detail in FIG. 6. The directions of the dotted arrows illustrate the possible degrees of freedom of movement of the movable part 200. Both a rotational and a translational movement are possible.

FIG. 6 illustrates an example of the individual components of the fluidic clamping device 100 according to the present invention shown in FIG. 5. In addition to the sleeve 110 described in FIGS. 1 to 4, the fluidic clamping device 100 further comprises an upper cap 120, a lower cap 130 and a connecting flange 140. In FIG. 6, the lower cap 130 has three openings 131. The number of openings 131 may be more or less than three. The number of openings 131 may correspond to a number of chambers 112. In FIG. 6, one opening 131 is in fluid communication with each chamber 112. Alternatively, one chamber 112 may be in fluid communication with two or more openings 131. In FIG. 6, the connecting flange 140 includes two channel entry apertures 142 and a channel 141. The channel is in fluid communication with the openings 131 of the lower cap 130. The upper cap 120 and the lower cap 130 serve to close the fluid-containing chambers 112 of the sleeve 110. The connecting flange 140 may serve as a mounting member for the fluid clamping device 100. Further, the connecting flange 140 distributes fluid from the channel inlet ports 142, through the channel 141 and the openings 131 into the chambers 112 of the sleeve 110. In the example shown in FIG. 6, two channel inlet ports 142 are provided to allow fluid communication and to provide venting during initial filling with fluid. Unlike the sleeve 110, the top cap 120, the bottom cap 130, and the connection flange 140 are not flexible during operation of the fluidic clamping device 100. The top cap 120 and/or the bottom cap 130 and/or the connection flange 140 may be used to secure the sleeve 110 in the mechanical system.

The sleeve 110, the upper cap 120, the lower cap 130 and the connecting flange 140 may comprise the same material. The material may have suitable, mechanical properties for the desired application and clamping force. The material may be an appropriate composite of metals, polymers, and other materials. For an application where a high clamping force is desired, the material may be a high strength steel or spring steel, for example a DIN/EN 51CrV4 steel or similar material. The material may suitably be heat treated, hardened or tempered to provide the optimum, mechanical properties for a desired operational performance and lifetime of the fluidic clamping device 100. In particular, sufficient deformation resistance and fatigue strength may be achieved for a given fluidic pressure within the sleeve 110 during repeated clamp-release operation. More preferably, the sleeve 110, the upper cap 120, the lower cap 130, and the connecting flange 140 are made of the same material and are bonded together such that the fluidic clamping device 100 forms a single piece. When the sleeve 110, the upper cap 120, the lower cap 130, and the connecting flange 140 are made of steel or other metallic material, the sleeve 110, the upper cap 120, the lower cap 130, and the connecting flange 140 may be joined together using brazing or soldering. This ensures adequate bonding between all parts in terms of mechanical integrity and sealing of the chambers 112, and achieves a single, monolithic element as the fluidic clamping device 100. The brazing filler material may have suitable, mechanical properties to withstand the structural stress caused by the fluidic pressure. The braze filler material may further have an appropriate melting point compatible with the required heat treatment of the material for the sleeve 110, the top cap 120, the bottom cap 130, and the connecting flange 140. For example, if the material for the sleeve 110, the upper cap 120, the lower cap 130 and the connecting flange 140 is DIN/EN 51CrV4 steel, the brazing filler material may be a nickel-based alloy, such as Ni 7Cr 4.5Si 3B 3Fe. The joining process may start with a brazing step, for example in a vacuum brazing furnace, to join the separated parts, namely the sleeve 110, the upper cap 120, the lower cap 130 and the connecting flange 140. Subsequently, the above-mentioned heat treatment steps may be performed on the obtained monolithic structure, not exceeding the melting temperature of the brazing filler material, in order to obtain the required mechanical properties of the fluidic clamping device 100.

Figure 7:
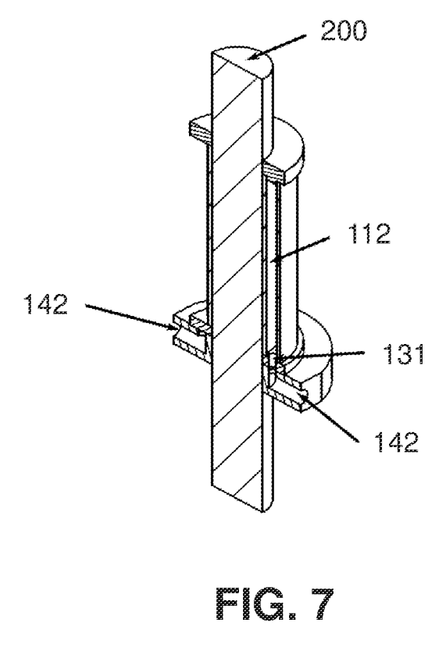
FIG. 7 shows a longitudinal sectional view of a fluidic clamping device according to the present invention.

FIG. 7 shows a longitudinal section through the fluidic clamping device 100 of FIGS. 5 and 6 according to the present invention. From FIG. 7, it can be seen that the fluidic clamping device 100 surrounds the movable part 200. Fluid can be supplied through the channel inlet openings 142 of the connecting flange 140. The openings 131 of the lower cap 130 are in fluid communication with the channel 141 of the connecting flange 140 and with the chambers 112 of the sleeve 110. Fluid can be distributed through the channel 141 of the connecting flange into the chambers 112 of the sleeve 110 through the openings 131 of the lower cap 130.

Figure 8:
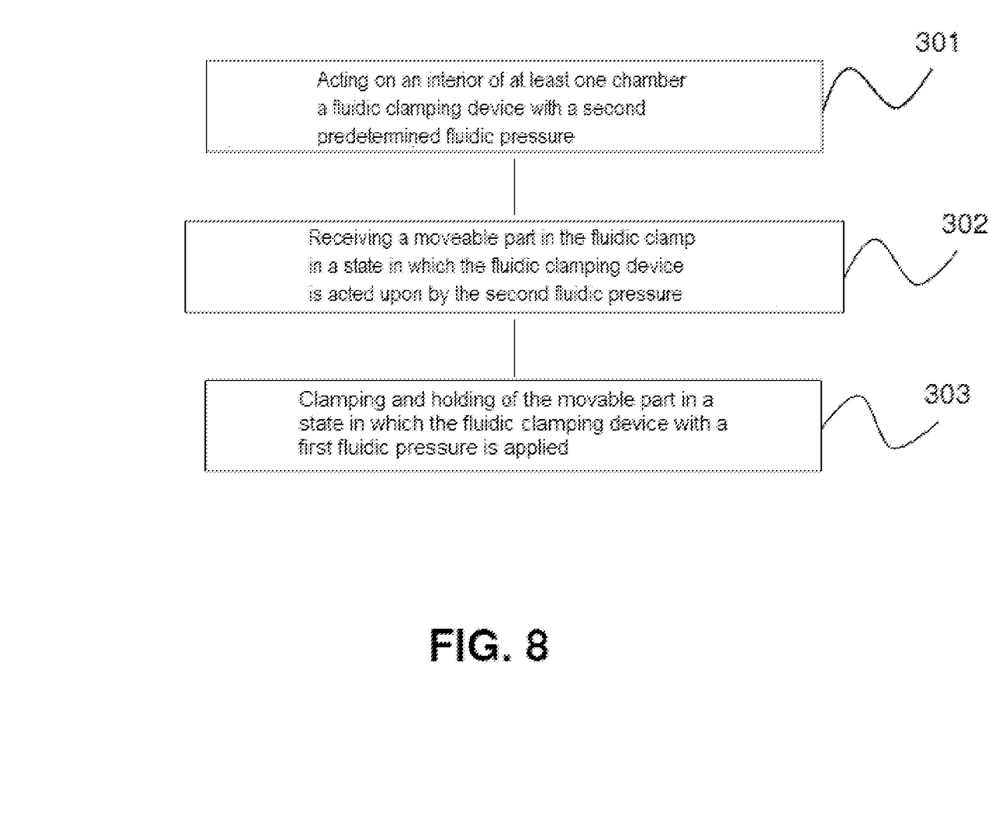
FIG. 8 shows a schematic diagram of a method of fluidically clamping and holding a movable part with a sleeve in a fluidic clamping device according to the present invention.

FIG. 8 schematically illustrates a method for fluidically clamping and holding a movable part with a sleeve in a fluidic clamping device according to the present invention. The method may be carried out using the fluidic clamping device 100 described in FIGS. 5 to 7, which comprises the sleeve 110 described in FIGS. 1 to 4. An initial step may precede the method illustrated in FIG. 8. In the initial step, the chambers 112 of the sleeve 110 may be filled with a preset amount of fluid using the first fluidic pressure. As described in connection with FIGS. 1 to 4, the central element 111 and the chambers 112 of the sleeve 110 are elastically deformable from an initial shape to a shape biased away from the cavity of the sleeve upon application of the second fluidic pressure to an interior of the chambers 112. In particular, for the initial filling of the chambers 112 in the initial step, the first fluidic pressure and the preset amount of fluid are selected to maintain the initial shape of the central element 111 and the chambers 112 of the sleeve 110. In the initial shape, in a cross-sectional view, one or more portions of the inner periphery of the central element 111 may extend into the cavity of the sleeve 110.

In step 301, the second predetermined fluidic pressure is applied to the interiors of the chambers 112. The forces thereby generated in the interiors of the chambers 112 cause elastic deformation of the chambers 112 and the central element 111 of the sleeve 110 from the initial shape to a shape biased away from the cavity of the sleeve. In this elastic deformation, the one or more portions of the inner periphery of the central element 111 that protrude into the cavity in the initial mold are stressed away from the cavity, pulling the one or more portions out of the cavity. The clearance 113 is formed. The movable part 200 and the central element 111 are movable relative to each other.

In the second state in which the fluidic clamping device is subjected to the second fluidic pressure, in step 302 the movable part 200 is received or moved in the cavity of the sleeve 110 of the fluidic clamping device 100.

In a further step, the second fluidic pressure is released from the chambers 112. The chambers 112 and the central element 111 return to their initial shape. The tensile forces are released and both the transformation of the chambers 112 and the central element relax. Due to the relaxation, the one or more portions of the inner periphery of the central element 111 protrude back into the cavity of the sleeve 110 of the clamping device 100 and engage the movable part 200 located in the cavity. In step 303, the fluidic clamping device 100 may return to the first state in which the interior of the chambers 112 is subjected to the first fluidic pressure, and the movable part 200 is fixed and clamped by the fluidic clamping device 100.

The invention claimed is:

1. A fluidic clamping device (100) having a sleeve (110) for clamping and holding a movable part (200), the sleeve (110) comprising:
   a central element (111) having a cross-section in a longitudinal direction of the central element (111), the central element (111) comprising a cavity defined along the longitudinal direction and configured to receive the movable part (200),
   characterised in that the sleeve (110) further comprises:
   at least one chamber (112) disposed on an outer periphery of the central element (111) and extending along the longitudinal direction of the central element (111), wherein the at least one chamber (112) being configured to receive a fluid in the longitudinal direction, wherein the fluidic clamping device (100) being configured to pressurize an interior of the at least one chamber (112) with a first predetermined fluidic pressure or a second predetermined fluidic pressure, wherein the first predetermined fluidic pressure being lower than the second predetermined fluidic pressure; and
   wherein the central element (111) is configured to be in frictional contact with the movable part (200) at least a region of an inner periphery of the central element (111) and to clamp and hold the movable part (200) in a first state in which the interior of the at least one chamber (112) is pressurized with the first fluidic pressure; and
   wherein the central element (111) is configured not to be in frictional contact with the movable part (200) at any region of the inner periphery of the central element (111) in a second state in which the interior of the at least one chamber (112) is subjected to the second fluidic pressure.

2. The fluidic clamping device (100) according to claim 1, wherein the at least one chamber (112) is configured to elastically deform from an initial shape when the second fluidic pressure is applied to the interior of the at least one chamber (112) and to return to its initial shape when the first fluidic pressure is applied to the interior of the at least one chamber (112).

3. The fluidic clamping device (100) according to claim 1, wherein the cross-section of the central element (111) in the second state in which the at least one chamber (112) is subjected to the second fluidic pressure is circular or has a polygonal shape.

4. The fluidic clamping device (100) according to claim 2, wherein the cross-section of the central element (111) is elastically deformable radially with deformation of the at least one chamber (112) upon application of the second fluidic pressure to the interior of the at least one chamber (112) and/or wherein the at least one chamber (112) is further configured to elastically deform away from the central element upon application of the second fluidic pressure to the interior of the at least one chamber (112) in a transverse direction that is perpendicular to the longitudinal direction.

5. The fluidic clamping device (100) according to claim 4, wherein deformation of the at least one chamber (112) can affect deformation of the central element (111).

6. The fluidic clamping device (100) according to claim 5, further comprising:
    an upper cap (120) disposed at an upper end of the at least one chamber (112);
    a lower cap (130) having at least one opening (131), the lower cap (130) being disposed at a lower end of the at least one chamber (112); and
    a connecting flange (140) having a channel (141) and at least one channel inlet opening (142), the channel (141) being in fluid communication with the at least one opening (131) of the lower cap (130).

7. The fluidic clamping device (100) according to claim 6, wherein a number of the at least one opening (131) of the lower cap (130) corresponds to a number of the at least one chamber (112).

8. The fluidic clamping device (100) according to claim 7, wherein the connecting flange (140) is further configured to distribute the fluid from the at least one channel inlet opening (142) through the channel (141) and the at least one opening (131) of the lower cap (130) into the at least one chamber (112).

9. The fluidic clamping device (100) according to claim 8, wherein the central element (111) and the at least one chamber (112) are integrally formed.

10. The fluidic clamping device (100) according to claim 9, wherein the upper cap (120), the lower cap (130) and the connecting flange (140) are inelastic and remain rigid in the first state or the second state.

11. The fluidic clamping device (100) according to claim 9, wherein the sleeve (111), the upper cap (120), the lower cap (130) and the connecting flange (140) comprise the same material.

12. The fluidic clamping device (100) according to claim 11, wherein a number of the at least one chamber (112) is two, three or more.

13. The fluidic clamping device (100) according to claim 1, further comprising:
    a first end of the central element (111); and
    a second end of the central element (111) longitudinally opposite to the first end relative to the longitudinal direction of the central element (111);
    wherein the at least one chamber (112) extends longitudinally between the first end and the second end.

14. A system for clamping and holding a movable part (200), comprising:
    a fluidic clamping device (100) having a sleeve (110) for clamping and holding a movable part (200), the sleeve (110) comprising
    a central element (111) having a cross-section in a longitudinal direction of the central element (111), the central element (111) comprising a cavity defined along the longitudinal direction and configured to receive the movable part (200),
    characterised in that the sleeve (110) further comprises:
    at least one chamber (112) disposed on an outer periphery of the central element (111) and extending along the longitudinal direction of the central element (111), wherein the at least one chamber (112) being configured to receive a fluid in the longitudinal direction, wherein the fluidic clamping device (100) being configured to pressurize an interior of the at least one chamber (112) with a first predetermined fluidic pressure or a second predetermined fluidic pressure, wherein the first predetermined fluidic pressure being lower than the second predetermined fluidic pressure; and
    wherein the central element (111) is configured to be in frictional contact with the movable part (200) at at least a region of an inner periphery of the central element (111) and to clamp and hold the movable part (200) in a first state in which the interior of the at least one chamber (112) is pressurized with the first fluidic pressure; and
    wherein the central element (111) is configured not to be in frictional contact with the movable part (200) at any region of the inner periphery of the central element (111) in a second state in which the interior of the at least one chamber (112) is subjected to the second fluidic pressure; and
    the movable part (200).

15. A method of fluidically clamping and holding a movable part (200) with a sleeve (110) in a fluidic clamping device (100), the method comprising the steps of:
    applying a first or second predetermined fluidic pressure to an interior of at least one chamber (112) of the sleeve (110) in a longitudinal direction, wherein the first predetermined fluidic pressure is lower than the second predetermined fluidic pressure;
    receiving the movable part (200) in a cavity of a central element (111) of the sleeve (110) in a second state in which the interior of the at least one chamber (112) is pressurized with the second fluidic pressure, wherein the central element (111) is not in frictional contact with the movable part (200) at any portion of an inner periphery of the central element (111), and wherein the cavity is defined along the longitudinal direction;
    clamping and holding the movable part (200) in a first state in which the interior of the at least one chamber (112) is subjected to the first fluidic pressure, wherein the central element (111) is in frictional contact with the movable part (200) at least a portion of the inner periphery of the central element (111);
    wherein the central element (111) has a cross-section in the longitudinal direction of the central element (111);
    wherein the at least one chamber (112) is disposed at an outer periphery of the central element (111) and extends along the longitudinal direction of the central element (111); and
    wherein the at least one chamber (112) is configured to receive a fluid in the longitudinal direction.

16. The method of claim 15, further comprising:
elastically deforming the at least one chamber (112) from an initial shape upon application of the second fluidic pressure to the interior of the at least one chamber (112); and
returning the at least one chamber (112) to the initial shape, upon application of the first fluidic pressure to the interior of the at least one chamber (112).

\* \* \* \* \*